(12) United States Patent
Chou

(10) Patent No.: US 7,520,021 B2
(45) Date of Patent: Apr. 21, 2009

(54) WHEEL ASSEMBLY

(75) Inventor: Chuan-Hai Chou, Sanchong (TW)

(73) Assignee: Haion Caster Industrial Co., Ltd., Sanchong, Taipei County (TW)

( * ) Notice: Subject to any disclaimer, the term of this patent is extended or adjusted under 35 U.S.C. 154(b) by 314 days.

(21) Appl. No.: 11/481,958

(22) Filed: Jul. 7, 2006

(65) Prior Publication Data

US 2008/0005868 A1 Jan. 10, 2008

(51) Int. Cl.
*B60B 33/00* (2006.01)
(52) U.S. Cl. .................................. 16/35 R; 16/18 R
(58) Field of Classification Search ................. 16/35 R, 16/18 R
See application file for complete search history.

(56) References Cited

U.S. PATENT DOCUMENTS

| | | | | |
|---|---|---|---|---|
| 2,972,163 A | * | 2/1961 | Ross et al. | 16/35 R |
| 3,890,669 A | * | 6/1975 | Reinhards | 16/35 R |
| 4,035,864 A | * | 7/1977 | Schroder | 16/35 R |
| 4,349,937 A | * | 9/1982 | Fontana | 16/35 R |
| 4,449,268 A | * | 5/1984 | Schnuell | 16/35 R |
| 5,675,864 A | * | 10/1997 | Chou | 16/35 R |
| 6,810,560 B1 | * | 11/2004 | Tsai | 16/35 R |
| 2006/0236501 A1 | * | 10/2006 | Chou | 16/35 R |

FOREIGN PATENT DOCUMENTS

| | | | |
|---|---|---|---|
| DE | 3346722 C1 | * | 6/1985 |
| JP | 02151501 A | * | 6/1990 |
| JP | 02283501 A | * | 11/1990 |

\* cited by examiner

*Primary Examiner*—Robert J Sandy
*Assistant Examiner*—Jeffrey O'Brien
(74) *Attorney, Agent, or Firm*—Troxell Law Office, PLLC

(57) ABSTRACT

A wheel assembly has a support unit, a rotating unit and an arresting unit. The support unit includes a sleeve, a stop hole and a recess. Brackets respectively extend from opposing sides of the sleeve. A rotating shaft pivots the wheel between the brackets. The rotating unit includes a base. An axis portion extends from a surface of the base for movably engaging with the sleeve. A tooth-like surface is formed on a side of the axis portion. The arresting unit includes a limiting portion movably pivoted between the brackets and in the vicinity of the wheel. A pressing plate pivots to an end of the limiting portion movably. A link portion movably links the limiting portion and the pressing plate and forms an abutting portion. The limiting portion forms a stop portion thereon. The arresting unit limits movement and rotation directions of the support unit and the wheel simultaneously.

7 Claims, 4 Drawing Sheets

WHEEL ASSEMBLY

BACKGROUND OF THE INVENTION (a) Field of the Invention

The present invention relates to a wheel assembly having an arresting portion, and particularly to a wheel assembly capable of limiting movement and rotation directions of a wheel simultaneously.

(b) Description of the Prior Art

A conventional truckle wheel assembly comprises a fixing base, a wheel frame, a plurality of balls and a wheel. The fixing base is fixed on a bottom of a machine by screws. The bottom of the machine forms a ring projection. At least a first receiving groove is defined around an outer surface of the ring projection. The wheel frame forms a ring neck on a top thereof for hitching the ring projection. At least a second receiving groove is defined along an inner surface of the ring neck and corresponds to the first receiving grooves. A plurality of balls is embedded in the first receiving grooves and the second receiving grooves. The wheel is pivoted on a bottom of the wheel frame and is rotatable about a wheel axis. The outer surface of the ring projection and the inner surface of the ring neck both have conic shape, which reduces shearing strength the balls bears and prevents the balls from abrasion or split, correspondingly prolonging its life.

However, in use, the truckle wheel assembly is fixed on a bottom of an object for moving the object easily. Ground of the predetermined target position is not always flat, for example, it may be a slope. So people have to place obstruction between the wheel and the ground to stop the wheel. Sometimes people also place obstruction between the wheel and the ground to prevent the wheel from rotating. The obstruction often is just a stone, a brick, or some paper, which is picked up at random in the predetermined position. It is hard to stop the wheel and the object when there is nothing to serve as obstruction.

SUMMARY OF THE INVENTION

Accordingly, an object of the present invention is to provide a wheel assembly which simultaneously limits movement and rotation direction of the wheel.

To achieve the above object, the wheel assembly of the present invention comprises a support unit pivoting to a wheel, a rotating unit and an arresting unit. The support unit includes a sleeve, a stop hole and a recess being respectively defined in the sleeve and neighboring to each other. Brackets respectively extend from opposing sides of the sleeve. A rotating shaft pivots the wheel between the brackets. The rotating unit includes a base. An axis portion extends from a surface of the base for movably engaging with the sleeve. A tooth-like surface is formed on a side of the axis portion for corresponding to the stop hole. The arresting unit includes a limiting portion movably pivoted between the brackets and in the vicinity of the wheel. A pressing plate pivots to an end of the limiting portion movably. A link portion movably links the limiting portion and the pressing plate and forms an abutting portion. A resilient member is provided between the link portion and the limiting portion and fastens to a shaft block on the link portion. The limiting portion forms a stop portion thereon for corresponding to the stop hole of the sleeve.

DETAILED DESCRIPTION OF THE PREFERRED EMBODIMENTS

Figure 1:
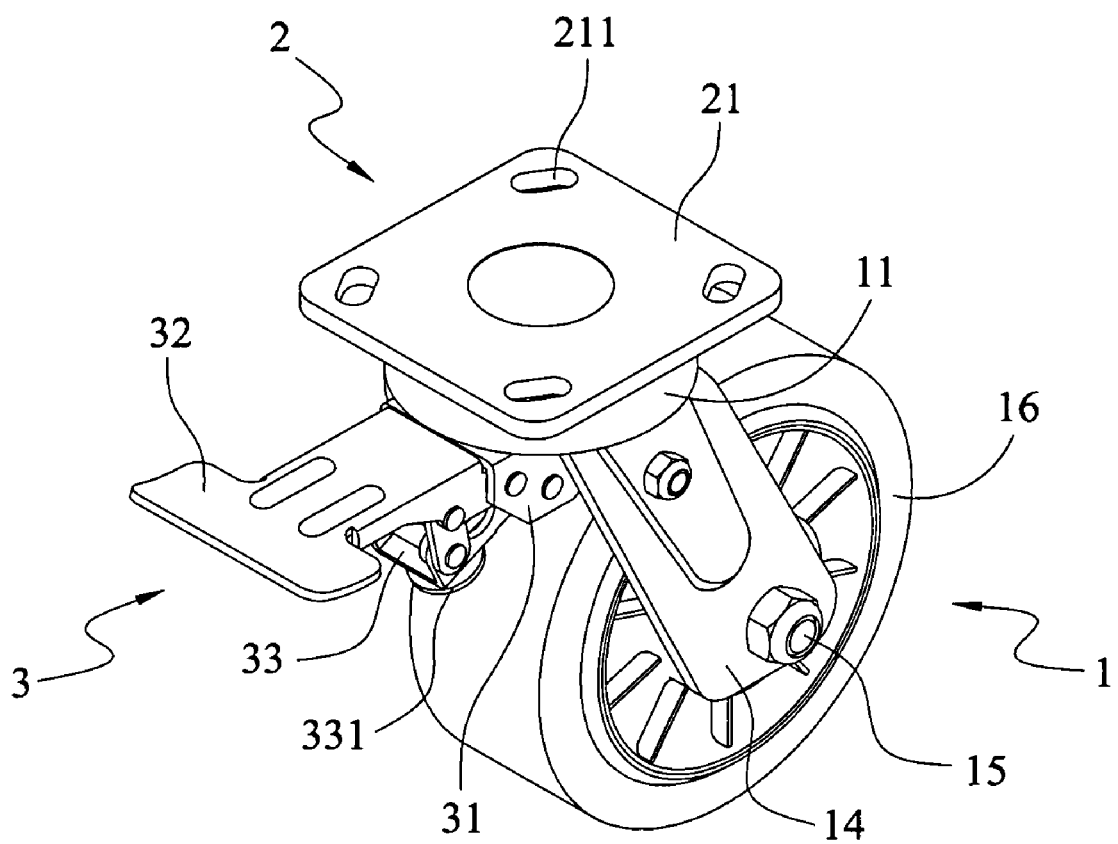
FIG. 1 is a perspective view of a wheel assembly according to the present invention.
Figure 2:
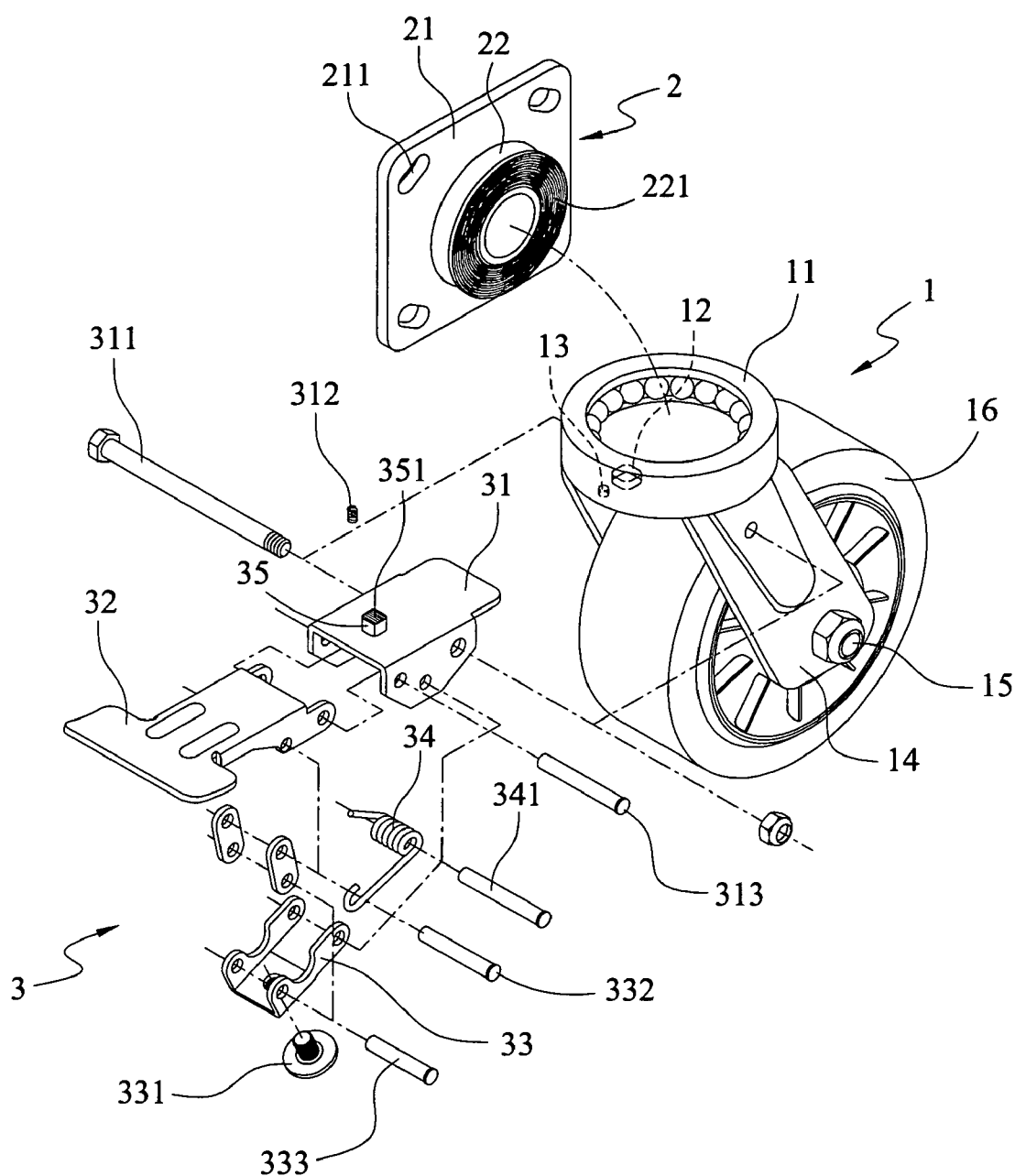
FIG. 2 is an exploded view of the wheel assembly of FIG. 1.
Figure 3:
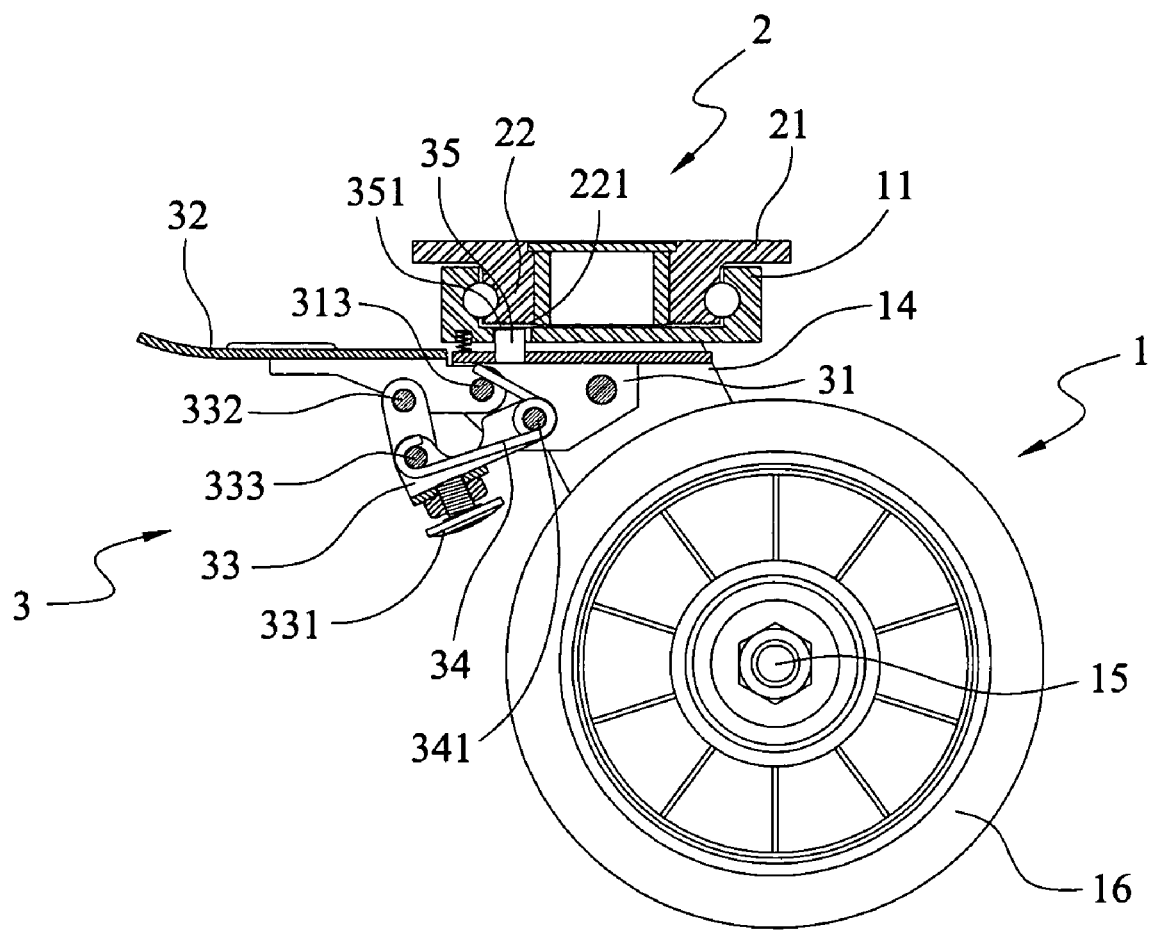
FIGS. 3 and 4 are side views of the wheel assembly in use.

With reference to FIGS. 1, 2 and 3, a wheel assembly in accordance with the present invention comprises a support unit 1 pivoting to a wheel 16, a rotating unit 2 and an arresting unit 3 assembled together. The arresting unit 3 is able to limit movement and rotation directions of the support unit 1 and the wheel 6 simultaneously.

The support unit 1 includes a sleeve 11, a stop hole 12 and a recess 13 being defined in the sleeve 11 and neighboring to each other. Brackets 14 respectively extend from opposing sides of the sleeve 11. A rotating shaft 15 pivots the wheel 16 between the brackets 14.

The rotating unit 2 includes a base 21 defining a plurality of fixing holes 211 therein. An axis portion 22 extends from a surface of the base 21 for movably engaging with the sleeve 11. A tooth-like surface 221 is formed on a side of the axis portion 22 for corresponding to the stop hole 12.

The arresting unit 3 has a limiting portion 31 movably pivoted between the brackets 14 and in the vicinity of the wheel 16 by an axis pole 311. A resilient portion 312 is provided between the limiting portion 31 and the sleeve 11 and is received in the recess 13. A pivoting shaft 313 pivots a pressing plate 32 to an end of the limiting portion 31 movably. A link portion 33 movably links the limiting portion 31 and the pressing plate 32, and includes an abutting portion 331. A first linking shaft 341 movably connects the link portion 33 with the limiting portion 31, and a second linking shaft 333 movably connects the link portion 33 with the pressing plate 32. A resilient member 34 is provided between the link portion 33 and the limiting portion 31, and fastens to a shaft block 341 on the link portion 33. The limiting portion 31 forms a stop portion 35 thereon for corresponding to the stop hole 12 of the sleeve 11. A tooth-like portion 351 is formed on a surface of the stop portion 35.

Figure 4:
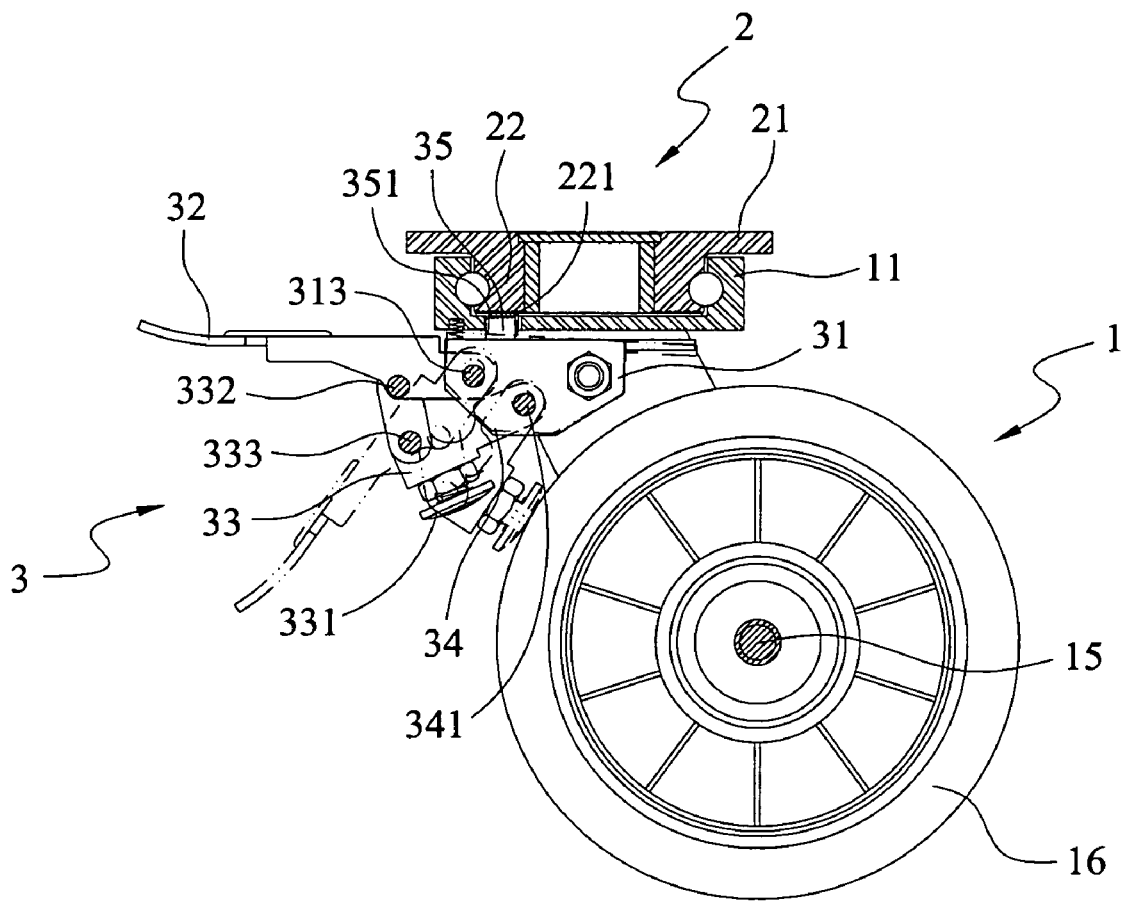

Referring to FIGS. 3 and 4, in use, fixing members (not shown) and the fixing holes 211 cooperate to retain an object (not shown) on the base 21 of the rotating unit 2. The wheel 16 rotates to move the object easily. The axis portion 22 and the sleeve 11 cooperate to rotate the wheel 16 in multiple directions, thereby saving labor for moving the object.

In the case that the object moves to a predetermined position or the support unit 1 and the wheel 6 need to be stopped, the pressing plate 32 is pressed downwardly. The limiting portion 31 is pushed toward the sleeve 11, and presses the resilient portion 312 in the recess 13. The stop portion 35 is pushed out from the stop hole 12 of the sleeve 11. The tooth-like portion 351 of the stop portion 35 abuts against the tooth-like surface 221 of the axis portion 22. The link portion 33 is pushed toward the wheel 16, and presses the resilient member 34. The abutting portion 331 of the link portion 33 abuts against a side of the wheel 16. Thus, movement of and rotation directions of the support unit 1 and the wheel 16 are both stopped. In the case to move the object, the pressing plate 32 is pushed upwardly. The resilient member 34 between the link portion 33 and the limiting portion 31, and the resilient portion 312 between the sleeve 11 and the limiting portion 31, are both released. The limiting portion 31 and the link portion 33 return to normal state. The tooth-like portion 351 of the stop portion 35 departs from the tooth-like surface 221 of the axis portion 22. The abutting portion 331 of the link portion 33 departs from the wheel 16. Meantime the support unit 1 and the wheel 16 are allowed to move and rotate freely.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A wheel assembly comprising: a support unit including a sleeve, a stop hole and a recess being defined in the sleeve and neighboring to each other, brackets respectively extending from opposing sides of the sleeve, a rotating shaft pivoting a wheel between the brackets; a rotating unit including a base, an axis portion extending from a surface of the base for movably engaging with the sleeve, a toothed surface being formed on a side of the axis portion for corresponding to the stop hole; and an arresting unit including a limiting portion movably pivoted between the brackets and in the vicinity of the wheel, a pressing plate pivoting to an end of the limiting portion movably, a link portion movably linking the limiting portion and the pressing plate and including an abutting portion, a resilient member being provided between the link portion and the limiting portion and fastening to a shaft block on the link portion, the limiting portion forming a stop portion thereon for corresponding to the stop hole of the sleeve, wherein a resilient portion is provided between the limiting portion and the sleeve and is received in the recess.

2. The wheel assembly as claimed in claim 1, wherein the base of the rotating unit defines a plurality of fixing holes therein.

3. The wheel assembly as claimed in claim 1, wherein an axis pole pivots the limiting portion movably between the brackets and in the vicinity of the wheel.

4. The wheel assembly as claimed in claim 1, wherein a pivoting shaft pivots a pressing plate to an end of the limiting portion movably.

5. The wheel assembly as claimed in claim 1, wherein a first linking shaft movably connects the link portion with the limiting portion, and a second linking shaft movably connects the link portion with the pressing plate.

6. The wheel assembly as claimed in claim 1, wherein a toothed portion is formed on a surface of the stop portion.

7. A wheel assembly comprising: a support unit including a sleeve, a stop hole and a recess being defined in the sleeve and neighboring to each other, brackets respectively extending from opposing sides of the sleeve, a rotating shaft pivoting a wheel between the brackets; a rotating unit including a base, an axis portion extending from a surface of the base for movably engaging with the sleeve, a toothed surface being formed on a side of the axis portion for corresponding to the stop hole; and an arresting unit including a limiting portion movably pivoted between the brackets and in the vicinity of the wheel, a pressing plate pivoting to an end of the limiting portion movably, a link portion movably linking the limiting portion and the pressing plate and including an abutting portion, a resilient member being provided between the link portion and the limiting portion and fastening to a shaft block on the link portion, the limiting portion forming a stop portion thereon for corresponding to the stop hole of the sleeve, wherein a first linking shaft movably connects the link portion with the limiting portion, and a second linking shaft movably connects the link portion with the pressing plate.

* * * * *